(12) United States Patent
Zhang et al.

(10) Patent No.: US 8,063,602 B2
(45) Date of Patent: Nov. 22, 2011

(54) STOCHASTIC ANTI-WINDUP PROPORTIONAL-INTEGRAL (PI) CONTROLLER

(75) Inventors: Da Zhang, Manchester, CT (US); Hui Li, Tallahassee, FL (US); Emmanuel G. Collins, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 615 days.

(21) Appl. No.: 12/202,574

(22) Filed: Sep. 2, 2008

(65) Prior Publication Data

US 2009/0091280 A1  Apr. 9, 2009

Related U.S. Application Data

(60) Provisional application No. 60/969,506, filed on Aug. 31, 2007.

(51) Int. Cl.
*G05B 11/42* (2006.01)

(52) U.S. Cl. ......................................... 318/610; 700/41

(58) Field of Classification Search .................. 318/610, 318/727, 609, 596; 700/37, 41, 42, 43
See application file for complete search history.

(56) References Cited

U.S. PATENT DOCUMENTS

| | | | | |
|---|---|---|---|---|
| 3,599,063 A * | 8/1971 | Nanai et al. | .................... | 388/821 |
| 3,938,017 A * | 2/1976 | Hayes | ........................... | 318/610 |
| 3,946,297 A * | 3/1976 | Bechtel | ........................ | 318/609 |
| 5,298,845 A * | 3/1994 | DeBoer et al. | ................. | 318/609 |
| 5,394,322 A * | 2/1995 | Hansen | ............................ | 700/37 |
| 6,657,575 B2 * | 12/2003 | Poletto | ............................ | 341/164 |
| 7,542,810 B2 * | 6/2009 | Chandhoke | ..................... | 700/42 |
| 7,642,737 B2 * | 1/2010 | Bae et al. | .................. | 318/400.02 |

* cited by examiner

*Primary Examiner* — Bentsu Ro
*Assistant Examiner* — Antony M Paul
(74) *Attorney, Agent, or Firm* — Novak Druce + Quigg

(57) ABSTRACT

Different circuit-based implementations of stochastic anti-windup PI controllers are provided for a motor drive controller system. The designs can be implemented in a Field Programmable Gate Arrays (FPGA) device. The anti-windup PI controllers are implemented stochastically so as to enhance the computational capability of FPGA.

9 Claims, 14 Drawing Sheets

STOCHASTIC ANTI-WINDUP PROPORTIONAL-INTEGRAL (PI) CONTROLLER

CROSS-REFERENCE TO RELATED APPLICATIONS

This application claims the priority of U.S. Provisional Application 60/969,506, which was filed on Aug. 31, 2007 with the U.S. Patent and Trademark Office and which is incorporated herein in its entirety.

FIELD OF THE INVENTION

The present invention is related to the field of motor drive controllers for induction motor systems, and more particularly, to proportional-integral (PI) controllers.

BACKGROUND OF THE INVENTION

A command signal intended to induce a large step change in the speed of a variable-speed motor drive typically causes the generated current command from a PI speed controller to exceed the prescribed maximum value, which is limited by the converter protection, the magnetic saturation, and the motor overheating. Thus, a saturator is usually applied, which introduces non-linearity into the system. This phenomenon is referred to as integrator windup. The phenomenon can result in a reduction in performance owing to the fact that the parameters of the PI speed controller are normally designed to operate in a linear region without regard to the nonlinearity that typically results from saturation.

A number of anti-windup techniques have been proposed in an attempt to overcome the windup phenomenon. One drawback of these conventional methods, however, is the complexity of the hardware implementation. Solutions for motor driver controllers implemented in circuits such as Field Programmable Gate Arrays (FPGAs) offer advantages in terms of price, execution speed, and flexibility. FPGAs, moreover, can perform rapid close-loop tasks without interfering with other tasks. Nonetheless, FPGAs are encumbered by relatively poor calculation capabilities and the relatively low number of available logic gates. Accordingly, there is a need for devices and techniques that more efficiently and effectively implement PI controllers, especially those utilizing FPGAs.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

The invention is directed to various devices and methods for implementing stochastic anti-windup PI controllers. The invention encompasses different circuit arrangements that, according to different embodiments of the invention, implement distinct anti-windup algorithms for a digital PI speed controller. As described herein, the anti-windup algorithms implemented by the circuit arrangements can significantly improve the control performance of variable-speed motor drives.

In particular embodiments described herein, the different implementations utilize a FPGA device and are configured on the basis of stochastic theory. The combination of a FPGA device with the application of certain principles drawn from stochastic theory in accordance with the invention enhance the computational capability of FPGA.

Figure 1A:
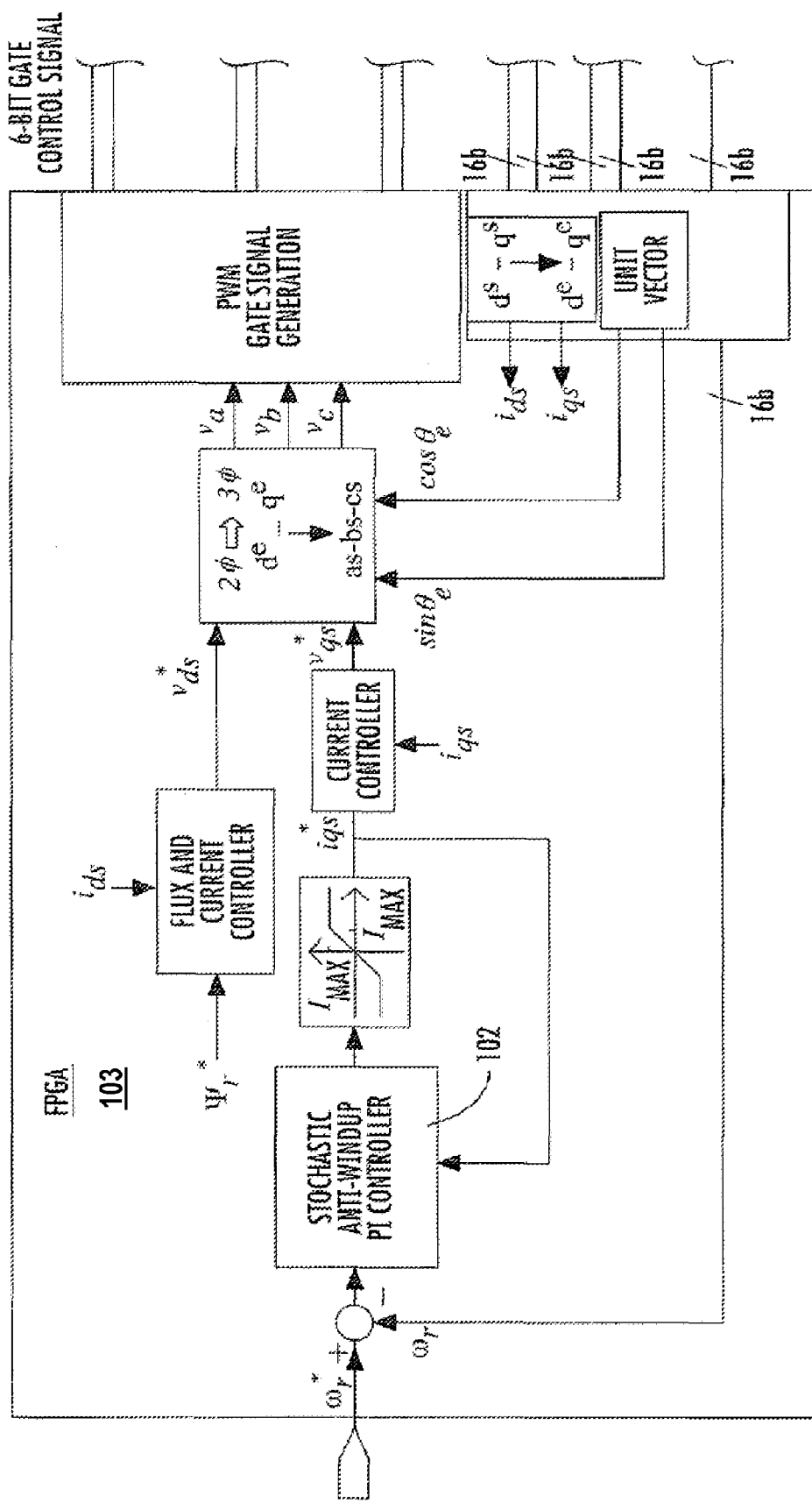
FIGS. 1A and 1B show a schematic view of an exemplary circuit in which a PI controller, according to one embodiment of the invention, is utilized.
Figure 1B:
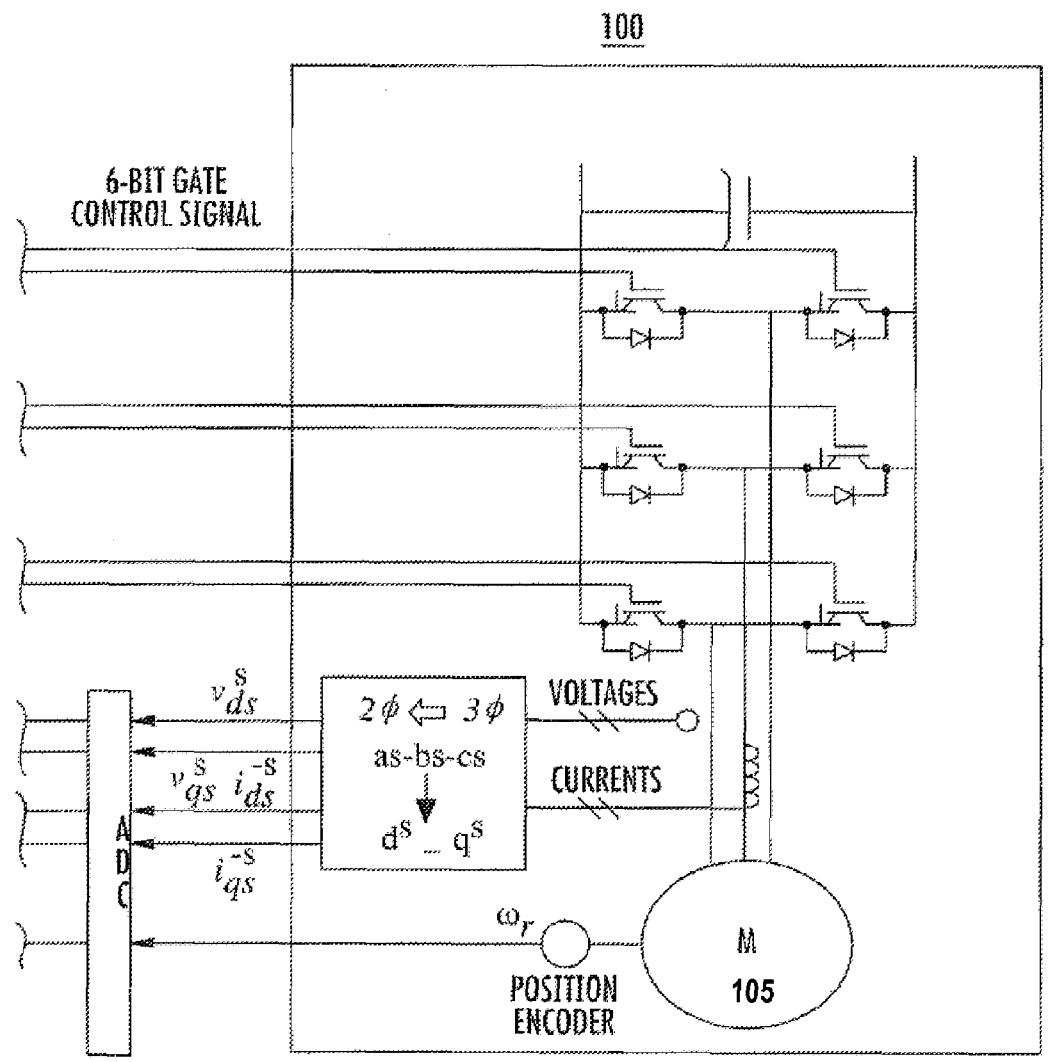

FIGS. 1A and 1B show a schematic view of an exemplary circuit 100 in which a stochastic anti-windup PI controller 102, according to one embodiment, implemented in an FPGA 103 is utilized. Illustratively, the PI controller 102 is connected to an exemplary variable-speed motor drive, 105 and provides control signaling to the second device. The stochastic anti-windup PI controller 102 can alternately be anyone of the different stochastic anti-windup PI controller implementations described more particularly below. As described, each alternate embodiment is based on a particular stochastic anti-windup digital PI control algorithm.

Figure 2:
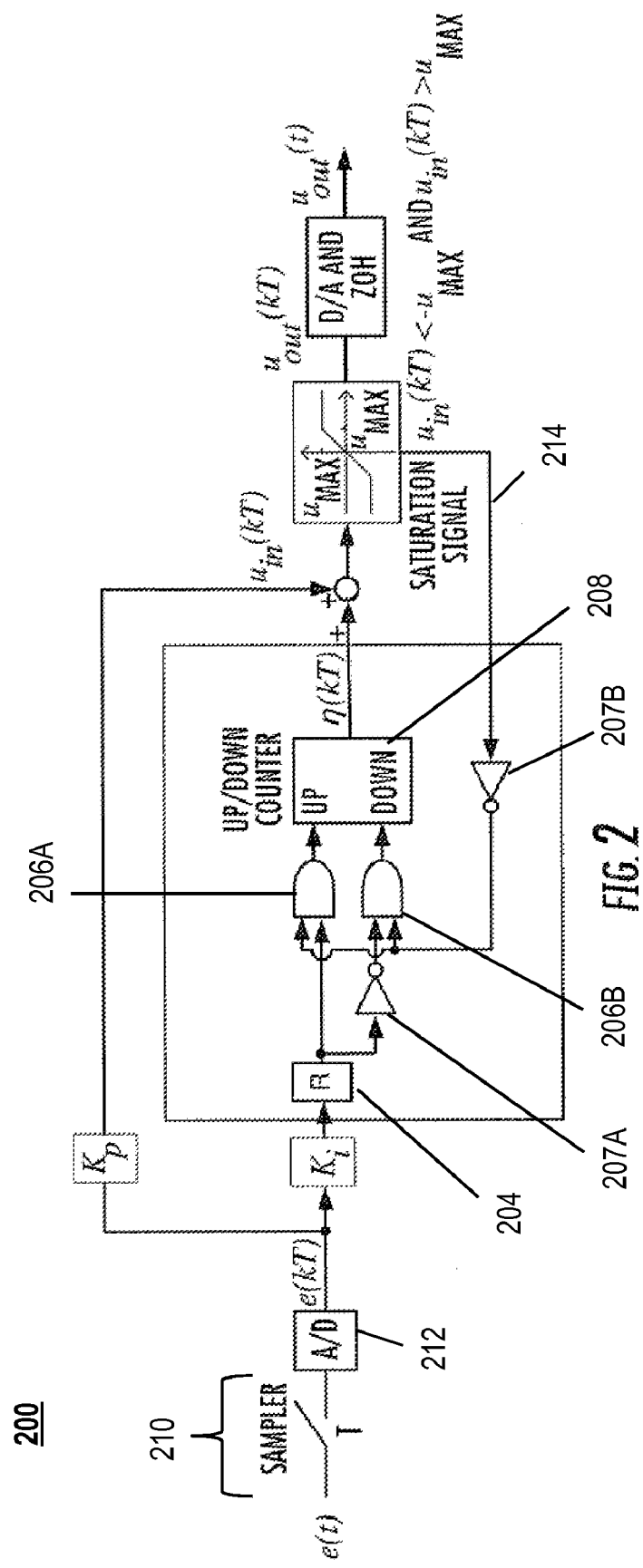
FIG. 2 is a schematic view of a stochastic PI controller, according one embodiment of the invention.

FIG. 2 is a schematic view of a circuit-based implementation 200 of a first stochastic anti-windup digital PI control algorithm, according to one embodiment of the invention. Illustratively, the algorithm is implemented utilizing a randomization block 202 connected to a signal input 204 connected to a first dual-input AND gate 206A and a second dual-input AND gate 206B, which in turn are each connected to an up/down counter 208. One input of the first AND gate 206A is connected to a first inverter 207A and one input of the second AND gate 206B is connected to a second inverter 207B. Illustratively, a sampler 210 samples an analog signal that is then converted to an digital signal by an analog-to-digital (A/D) converter 212.

As illustrated, a saturation signal 214 is connected to the up/down counter 208 through the two AND gates 206A, 206B. When the saturation signal 202 is '1" the output of the two AND gates 206A, 206B both become '0', which disables the accumulation of the up/down counter 208. The integration process operates normally when the saturation signal 214 is '0' for the linear region. Accordingly, the illustrated scheme performs the same anti-windup function as the conventional anti-windup strategy, as the integration action switches off when saturation occurs.

Figure 3:
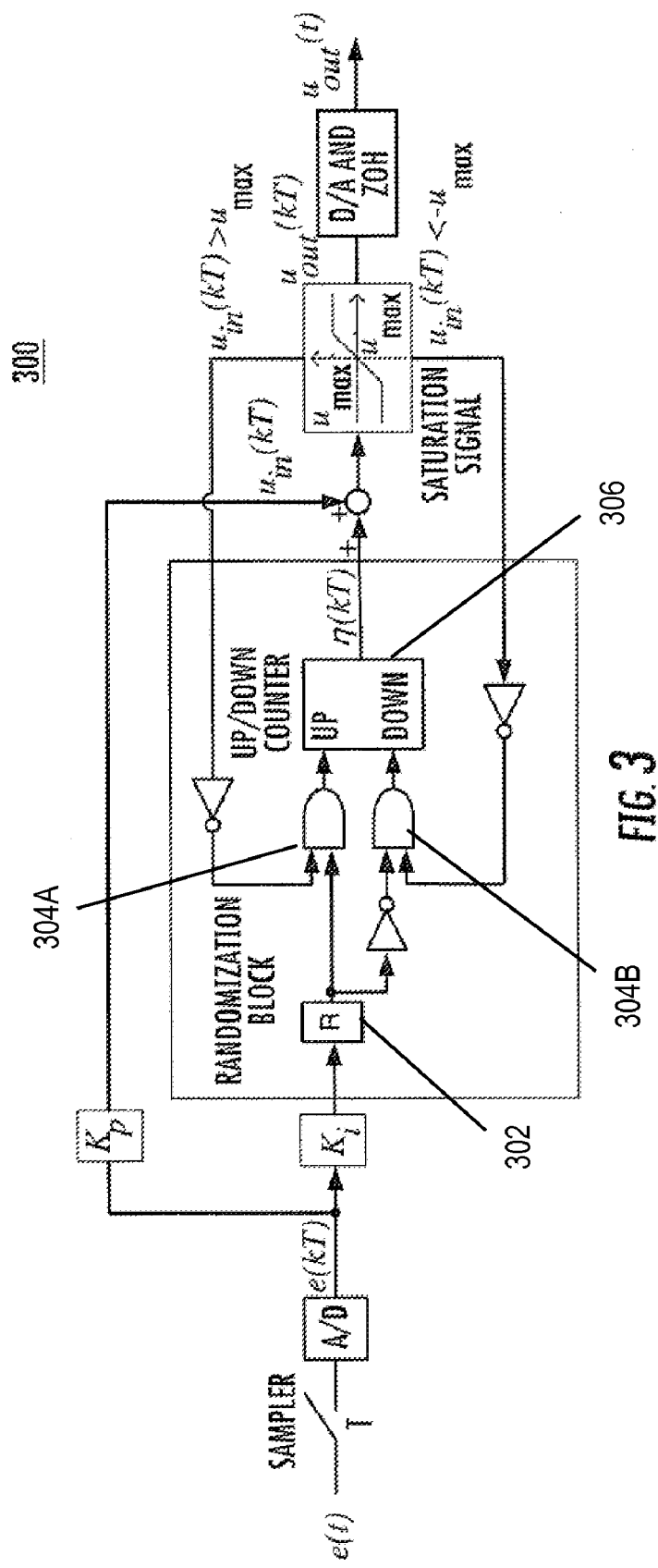
FIG. 3 is a schematic view of a stochastic PI controller, according to another embodiment of the invention.

FIG. 3 is a schematic view of a circuit-based implementation 300 of a second stochastic anti-windup digital PI control algorithm, according to another embodiment of the invention. Again, a randomization block 302 is connected through a first dual-input AND gate 304A and a second dual-input AND gate 304B to an up/down counter 306.

According this implementation, when the output of the PI controller exceeds the upper limit of a saturator, the first AND gate 304A transmits a "0" to an up port of the up/down counter 306, and the down port continues to receive transmitted pulses. Thus, the integral term will decrease, which, as a result, tends to bring the PI controller back to the linear region. The saturation happens at the lower limit. That causes the increase of the integral term and avoids an accumulation of errors.

Figure 4:
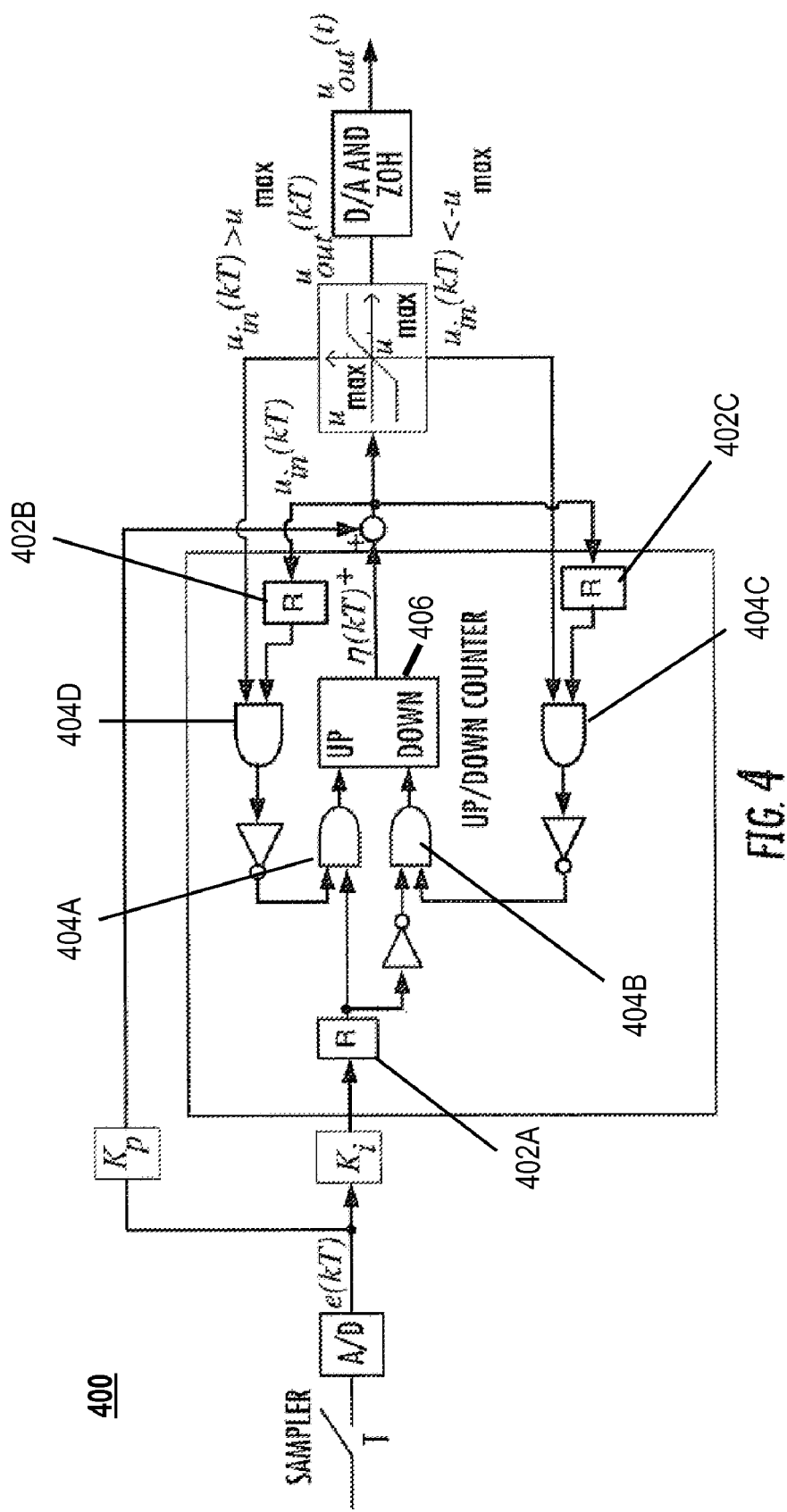
FIG. 4 is a schematic view of a stochastic PI controller, according to still another embodiment of the invention.

FIG. 4 is a schematic view of a circuit-based implementation 400 of a third stochastic anti-windup digital PI control algorithm, according to another embodiment of the invention. The exemplary circuit comprises a first randomization block 402A a second randomization block 402B, and a third randomization block 402C. The exemplary circuit further includes a first dual-input AND gate 404A, a second dual-input AND gate 404B, a third dual-input AND gate 404C, and a fourth AND gate 404D. Additionally, the exemplary circuit for implementing this third anti-windup digital PI control algorithm includes an up/down counter 406.

As shown, the first randomization block 402A is connected to one input of the: first dual-input AND gate 404A and, through an inverter 405A, to an input of the second dual-input AND gate 404B. The second randomization block 402B is connected to an input of the fourth dual-input AND gate 404D, the other input of which receives a saturation signal. The third randomization block 402C is connected to an input of the third dual-input AND gate 404C, the other input of which also receives the saturation signal. As further illustrated, the output of the fourth dual-input AND gate 404D is inverted and supplied to an input of the first dual-input AND gate 404A. The output of the third dual-input AND gate 404C is inverted and supplied to an input of the second dual-input AND gate 404B. The output of the first AND gate 404A is supplied to the up port of the up/down counter 406, and the output of the second AND gate 404B is supplied to the down port of the up/down counter.

This scheme provides a tuning parameter to adjust the anti-windup performance. The output of the PI controller is randomized to a bit-stream and connected with the saturation signals as well as with AND gates. In this way, when saturation occurs, the up and down ports all are receiving incoming pulses, but the randomization process determines the rate of the increase or decrease for the integral term when saturation occurs. The constant C in the randomization process becomes a free tuning parameter that can be adjusted to achieve an optimized performance.

The digital integrator can be expressed as in equation (1), following:

$$y(n)=x(n)+y(n-1) \quad (1)$$

Figure 5:
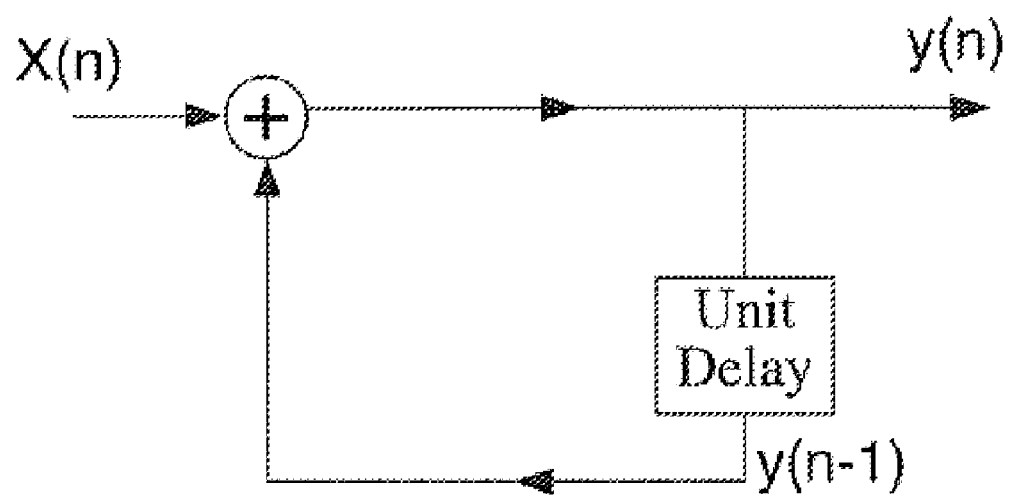
FIG. 5 is a schematic view of a digital integrator, according to another embodiment of the invention.

FIG. 5 is a schematic view of the structure of the digital integrator 500.

Figure 6A:
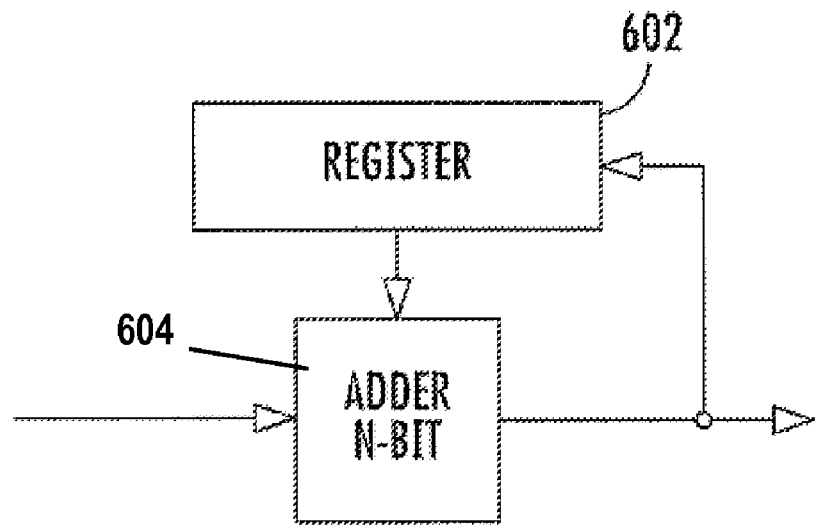
FIGS. 6A and 6B are schematic views, respectively, of a conventional digital integrator and a stochastic-based digital integrator according to an embodiment of the invention.

FIG. 6A is a schematic view of a digital integrator 600A according to a traditional accumulator design. As shown, a register 602, preferably a large-size register, holds the previous output of the integrator 600A and transmits a one-step, time-delayed output signal back to an n-bit adder 604 to perform the integration function.

Figure 6B:
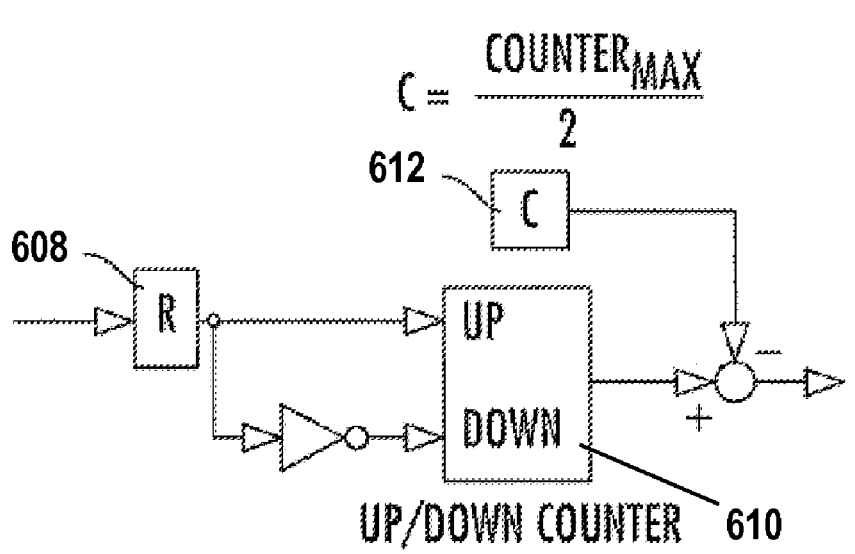

FIG. 6B is a schematic view of an alternative stochastic digital integrator 600B, the design of which is based upon stochastic arithmetic according to an embodiment of the invention. The stochastic digital integrator 600B illustratively comprises the following elements: a signal-value-to-frequency converter (randomization block) 608 and an up-down (pulse) counter 610, the output of which is summed with the output of a counter 612.

Figure 7:
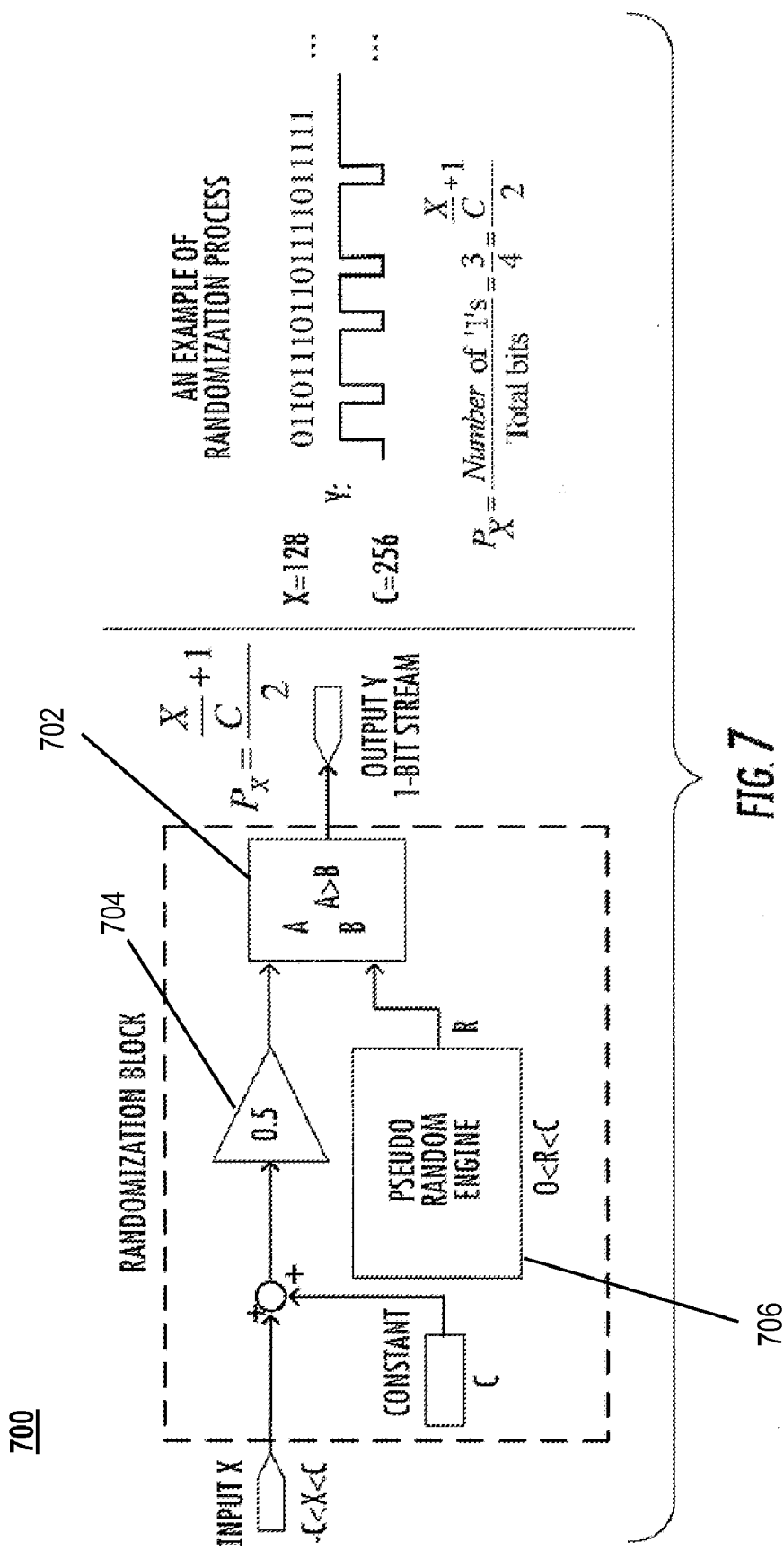
FIG. 7 is a schematic representation of a randomization process, according to another embodiment of the invention.

FIG. 7 is a schematic view of a randomization block 700. The randomization block 700 illustratively includes a comparator 702, a first input of which receives the output of an op amp 704 and a second input of which receives the output of a pseudo-random engine 706. With the randomization process effected by the exemplary circuit shown in FIG. 7, the value of the input signal x is represented by the frequency of '1', which appears in the output bit stream. If p is the probability of having a bit value of '1' in any position in the bit stream, then the value of the input signal is given by equation (2), following:

$$x=(2p-1) \cdot c \quad (2)$$

where c is a constant, and the input x lies in the range of −c and c. For example, if the input x equals c, then the output bit stream will be all '1's. If x equals −c, the output bit stream will be all '0's. After this process concludes, an up/down counter, such as up/down counter 610 in FIG. 6B, accumulates the incoming pulses and performs the integration function.

Compared with the conventional approach of implementing a digital integrator, the stochastic method has a larger dynamic range and can obviate the need for an n-bit adder that typically contains tens of logic gates. Although the randomization process requires extra digital resources for the pseudo random engine and the comparator, these resources can be shared if many digital integrators are employed in the same digital integrated circuits (ICs), thereby saving the digital resources occupied by single digital integrator for large systems.

Figure 8A:
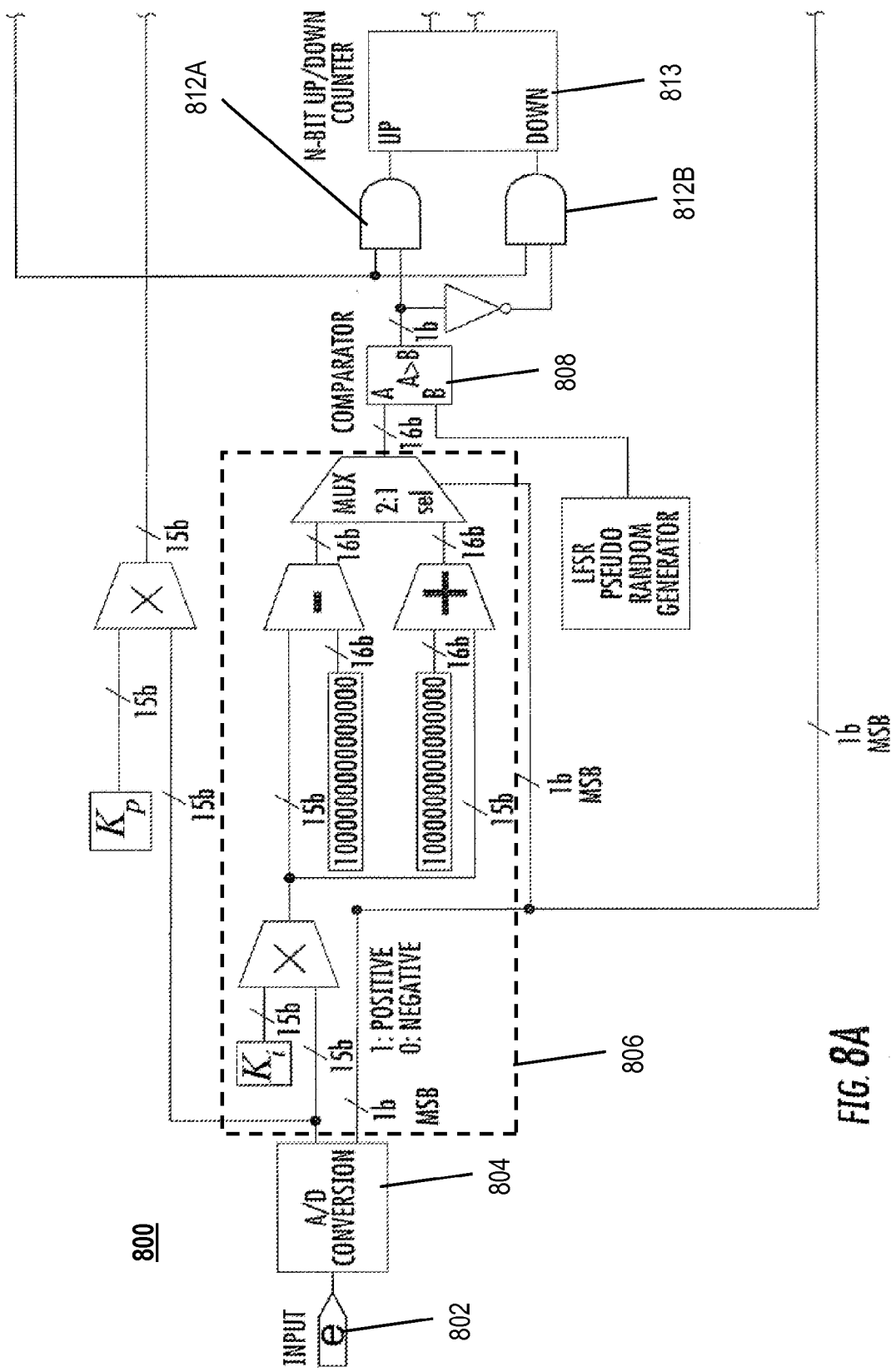
FIGS. 8A and 8B show a schematic, view of a digital design scheme of a proposed stochastic anti-windup PI controller, according to yet another embodiment of the invention.
Figure 8B:
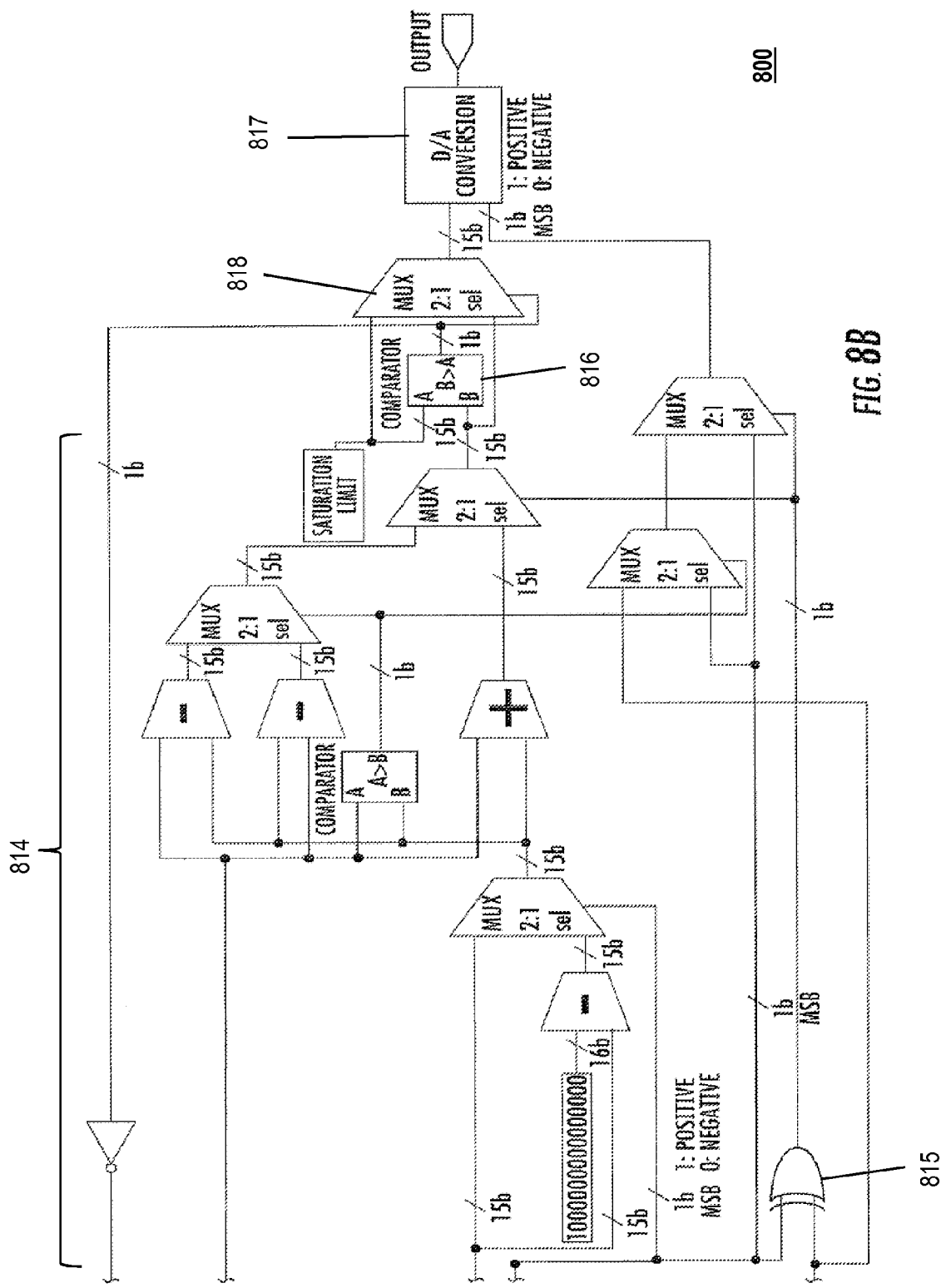

FIGS. 8A and 8B schematically illustrate a digital design scheme of the proposed stochastic anti-windup PI controller 800, according to, a particular embodiment. The PI controller 800, according to this embodiment, comprises a signal input 802 connected to an A/D converter 804. The signal output of the A/D converter is supplied to processing circuitry comprising arithmetic logic units (ALUs) 806, the output of which supplied to one port of a comparator 808. The PI controller 800 illustratively includes a pseudo random generator 810 that supplies a signal to the other port of the comparator 808. The comparator, 808 is connected to inputs of a pair of AND gates 812A, 812B. (As shown the signal inputs of one gate 812B are inverted.) The signal outputs of the pair of AND gates 812A, 812B are supplied to an up/down counter 813, the output of which is supplied to additional processing circuitry 814 and an input of an XOR gate 815 which in turn supplies a signal to another comparator 816. The PI controller 800 further includes a digital-to-analog (D/A) converter 817 connected through an ALU 818 to the comparator 816.

Figure 9A:
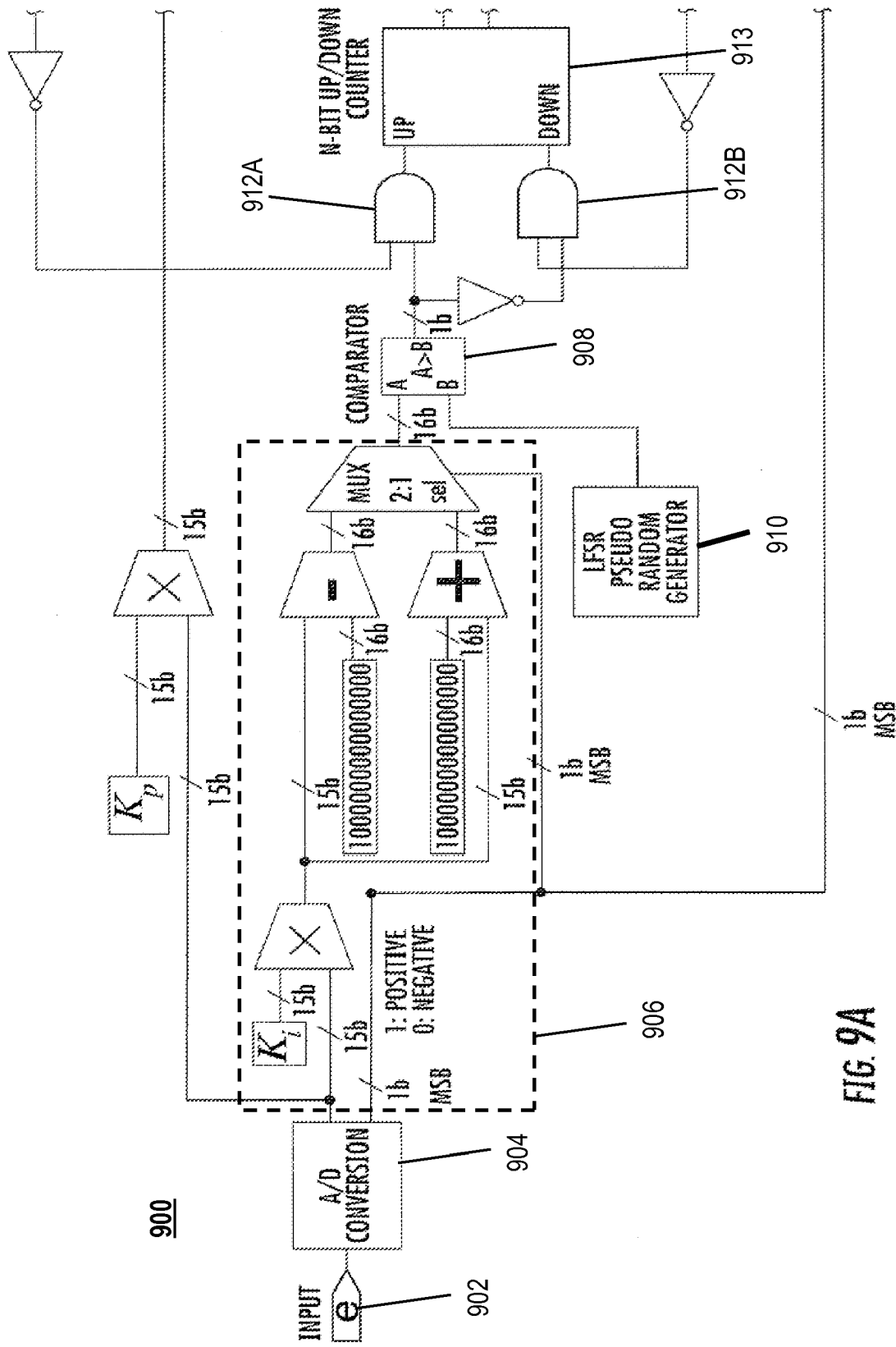
FIGS. 9A and 9B show a schematic view of another digital design scheme of a proposed stochastic anti-windup PI controller, according to still another embodiment of the invention.
Figure 9B:
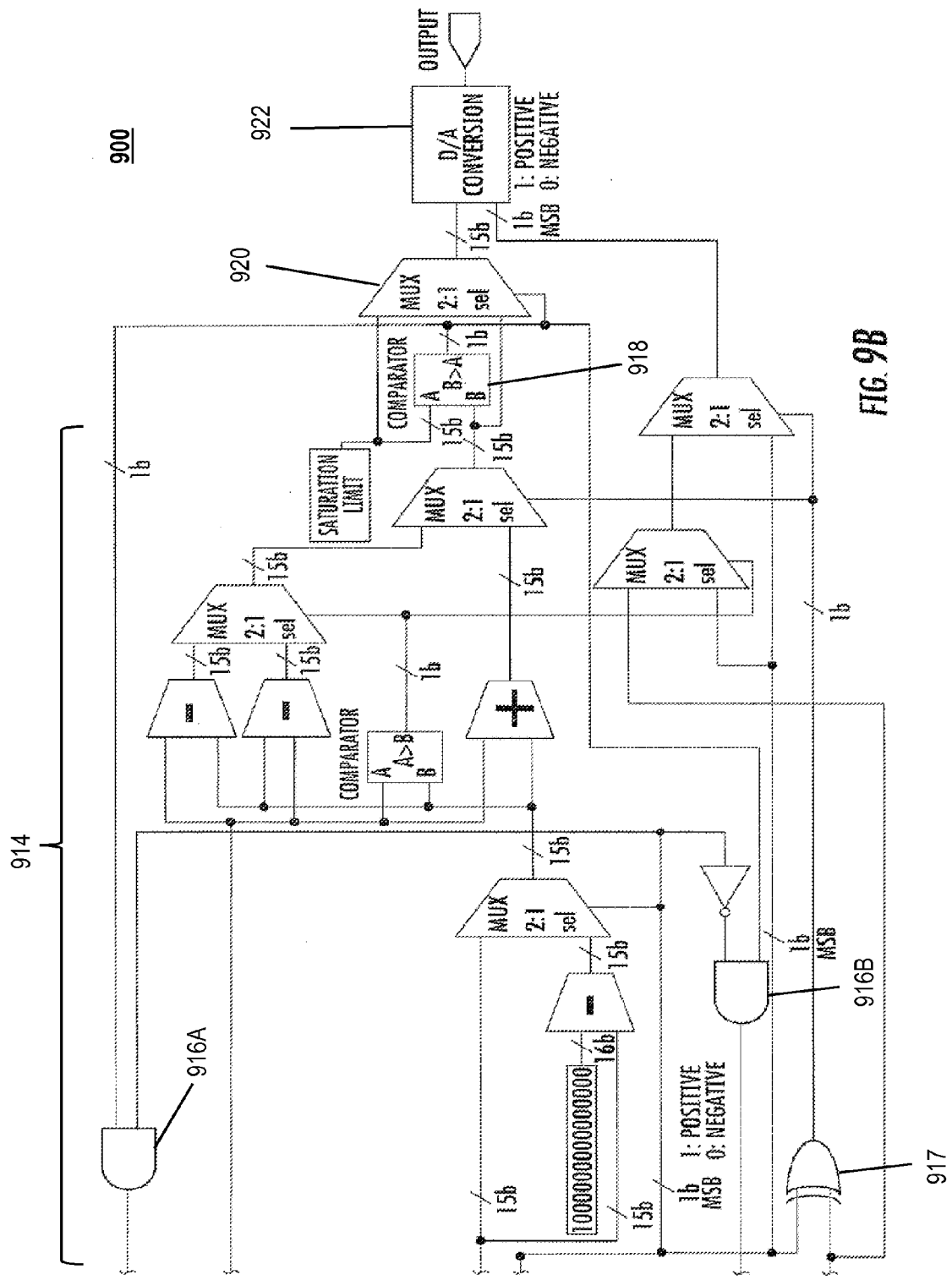

FIGS. 9A and 9B schematically illustrate another digital design scheme of the proposed stochastic anti-windup PI controller 900, according to another embodiment. The PI controller 900, according to this embodiment, also comprises a signal input 902 connected to an A/D converter 904. The signal output of the A/D converter is supplied to processing circuitry comprising arithmetic-logic units (ALUs) 906, the output of which supplied to one port of a comparator 908. The PI controller 900 illustratively includes a pseudo random generator 910 that supplies a signal to the other port of the comparator 908. Signal inputs, as shown, to one port of each of the AND gates 912A, 9128 are inverted. The signal outputs of the pair of AND gates 912A, 912B are supplied to an up/down converter 913, the output of which is supplied to additional processing circuitry 914 and two additional AND gates 916A, 916B as well as an input to an XOR gate 917. The output of the up/down converter 913 is supplied to another comparator 918 through the additional processing, circuitry 914. A signal is supplied to a D/A 922 connected through an ALU 920.

Figure 10A:
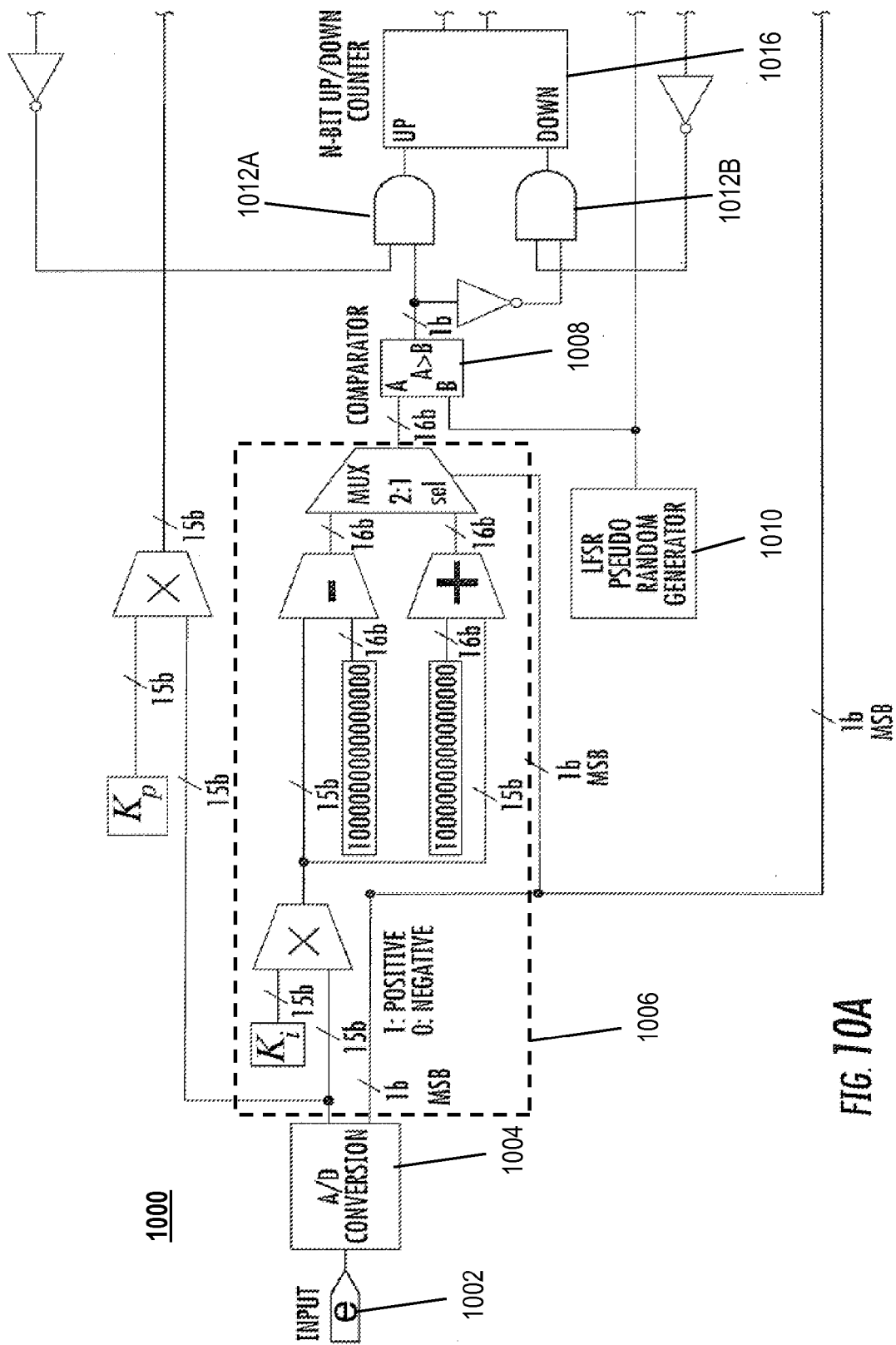
FIGS. 10A and 10B show a schematic view of another digital design scheme of a proposed stochastic anti-windup PI controller, according to yet another embodiment of the invention.
Figure 10B:
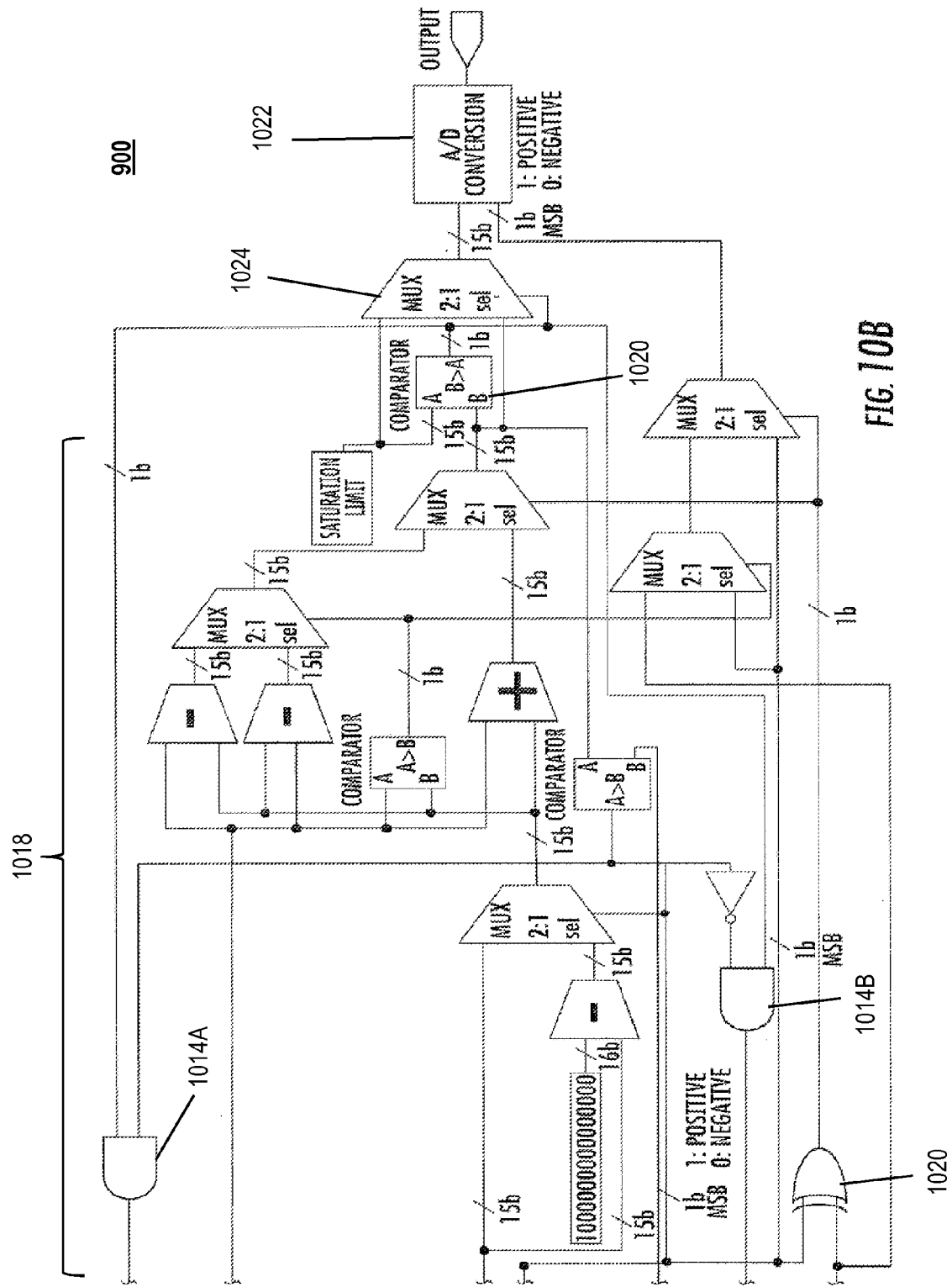

FIGS. 10A and 10B schematically illustrate a digital design scheme of the proposed stochastic anti-windup PI controller 1000. The PI controller 1000 according to this embodiment, also comprises a signal input 1002 connected to an A/D converter 1004. The signal output of the A/D converter is supplied to processing circuitry comprising arithmetic logic units (ALUs) 1006, the output of which supplied to one port of a comparator 1008. The PI controller 1000 illustratively includes a pseudo random generator 1010 that supplies a signal to the other port of the comparator 1008. The comparator provides a signal to inputs of a pair of AND gates 1012A, 1012B. (The signal input to one AND gate 1012B is inverted.) The other respective inputs of the pair of AND gates 1012A, 1012B are signals (inverted) supplied by the: output of two additional AND gates 1014A, 1014B. The signal outputs of the pair of AND gates 1012A, 1012B are supplied to an up/down converter 1016, the output of which is supplied to additional processing, circuitry 1018 as well as an input to an XOR gate 1020. The output of the up/down converter 1016 is supplied to another comparator 1020 through the additional processing circuitry 1018. A signal is supplied to a D/A converter 1022 connected through an ALU 1024.

The stochastic arithmetic performed by the circuitry provides a better way to enhance the computation capability of an FPGA with the same logic gate density of conventional circuits. The stochastic PI controller provides an efficient implementation approach that uses straightforward digital logic circuits but has the advantage of significantly reducing the circuit complexity compared with the traditional digital implementation approach. Therefore, the present invention notably improves the performance of the stochastic PI controller and saves digital resources in a motor drive control system.

The invention can be realized in hardware or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A stochastic anti-windup digital proportional-integral (PI) control circuit for controlling performance of a variable-speed motor drive, the circuit comprising:
   a randomization block;
   a plurality of logic-based AND gates, each having a signal input for receiving a signal output of the randomization block, and another signal input for receiving a saturation signal; and
   an up/down counter for receiving signal outputs from the plurality of AND gates;
   wherein the circuit is configured to perform a normal integration process when the saturation process is in a linear region,
   a second set of AND gates, each having a signal input for receiving a signal output of a corresponding one of the AND gates of the first set of AND, and another signal input from a corresponding one of the plurality of randomization blocks;
   wherein the circuit is configured to provide a tunable parameter that can be tuned to adjust the anti-windup performance of the circuit.

2. The circuit according to claim 1, wherein the circuit is implemented as field programmable gate array (FPGA).

3. The circuit according to claim 1, wherein the randomization block comprises:
   a comparator having a first input and a second input;
   an op amp connected to the first input of the comparator; and
   a pseudo random engine connected to the second input of the comparator.

4. A stochastic anti-windup digital proportional-integral (PI) control circuit for controlling performance of a variable-speed motor drive, the circuit comprising:
   a randomization block;
   a plurality of logic-based AND gates, each having a signal input for receiving a signal output of the randomization block, and another signal input for receiving a saturation signal; and
   an up/down counter for receiving signal outputs from the plurality of AND gates;
   wherein the circuit is configured to respond when an output signal of the circuit exceeds an upper limit of a saturator connected to the circuit, the circuit responding by altering performance so as to return to a linear region.

5. The circuit according to claim 4, wherein the circuit is implemented as field programmable gate array (FPGA).

6. The circuit according to claim 4, wherein the randomization block comprises:
   a comparator having a first input and a second input;
   an op amp connected to the first input of the comparator; and
   a pseudo random engine connected to the second input of the comparator.

7. A stochastic anti-windup digital proportional-integral (PI) control circuit for controlling performance of a variable-speed motor drive, the circuit comprising:
   a randomization block;
   a plurality of logic-based AND gates, each having a signal input for receiving a signal output of the randomization block, and another signal input for receiving a saturation signal; and
   an up/down counter for receiving signal outputs from the plurality of AND gates;
   wherein the circuit is configured to perform a normal integration process when the saturation process is in a linear region.

8. The circuit according to claim 7, wherein the circuit is implemented as field programmable gate array (FPGA).

9. The circuit according to claim 7, wherein the randomization block comprises:

a comparator having a first input and a second input;

an op amp connected to the first input of the comparator; and a pseudo random engine connected to the second input of the comparator.

\* \* \* \* \*